United States Patent
Pandura et al.

(10) Patent No.: US 8,731,222 B2
(45) Date of Patent: May 20, 2014

(54) HOLDING DEVICE FOR LOUDSPEAKERS IN A MOTOR VEHICLE

(75) Inventors: Michael Pandura, Bietgheim-Bissingen (DE); Martin Frank, Muehlacker (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 184 days.

(21) Appl. No.: 13/008,927

(22) Filed: Jan. 19, 2011

(65) Prior Publication Data

US 2011/0176702 A1     Jul. 21, 2011

(30) Foreign Application Priority Data

Jan. 20, 2010  (DE) .......................... 10 2010 005 028

(51) Int. Cl.
*H04R 1/02* (2006.01)

(52) U.S. Cl.
USPC ............................................ 381/332; 381/86

(58) Field of Classification Search
USPC .............. 381/86, 87, 332, 333, 386, 388, 389
See application file for complete search history.

(56) References Cited

U.S. PATENT DOCUMENTS

| | | | |
|---|---|---|---|
| 7,563,989 B1* | 7/2009 | Fils | 174/480 |
| 8,184,847 B2* | 5/2012 | Bertoli et al. | 381/389 |
| 2011/0176689 A1* | 7/2011 | Biggs et al. | 381/86 |

FOREIGN PATENT DOCUMENTS

| DE | 3 521 088 | 12/1985 |
|---|---|---|
| DE | 41 08 504 | 9/1992 |
| DE | 198 07 259 | 8/1999 |
| DE | 198 24 130 | 7/2005 |
| DE | 10 2004 027 981 | 11/2005 |
| DE | 10 2005 033 116 | 1/2007 |

* cited by examiner

*Primary Examiner* — Curtis Kuntz
*Assistant Examiner* — Joshua A Kaufman
(74) *Attorney, Agent, or Firm* — Gerald E. Hespos; Michael J. Porco; Matthew T. Hespos

(57) ABSTRACT

To hold loudspeakers of different sizes in an instrument panel of a motor vehicle, a holding plate with a cutout for inserting a first variant of a circular loudspeaker is arranged in the wall part of a defroster duct, and the holding plate can, by means of predetermined breaking points arranged at the edge in the direction of the wall part, be detached in order to obtain a further, larger cutout for inserting a second variant of a rectangular loudspeaker.

11 Claims, 3 Drawing Sheets

US 8,731,222 B2

HOLDING DEVICE FOR LOUDSPEAKERS IN A MOTOR VEHICLE

CROSS-REFERENCE TO RELATED APPLICATION

This application claims priority under 35 USC 119 to German Patent Application No. 10 2010 005 028.8, filed on Jan. 20, 2010, the entire disclosure of which is incorporated herein by reference.

BACKGROUND OF THE INVENTION

1. Field of the Invention

The invention relates to a holding device for loudspeakers in a wall part of a defroster duct of a motor vehicle, with loudspeakers being held fastened in a cutout of the holding device.

2. Description of the Related Art

DE 3 521 088 A1 discloses a device for mounting a vehicle loudspeaker at a predetermined location in the vehicle. The loudspeaker is arranged in a holding opening of a plate and has integrally formed mounting plates on a frame. The mounting plates have perforations and can be removed or detached to obtain an adaptation to the holding opening.

It is an object of the invention to provide a holding device for loudspeakers in a wall of a vehicle that enables different variants of loudspeakers to be inserted easily into the wall.

SUMMARY OF THE INVENTION

The invention relates to a holding plate for a wall of a vehicle that enables loudspeakers of different types and dimensions to be mounted. The holding plate is arranged in the wall and has a cutout for inserting a first variant of a loudspeaker. The holding plate is detachable by means of predetermined breaking points arranged at the edge in the direction of the wall to obtain a larger cutout for inserting a second variant of a larger loudspeaker. The cutout for the first variant of the loudspeaker in the holding plate may be of circular design and the cutout for the second variant of the loudspeaker may be of rectangular design after detaching at least parts of the holding plate that has the cutout for the first variant of the loudspeaker. The holding plate may be in the wall of a defroster duct. Significantly, a loudspeaker of a first size and shape and a loudspeaker of a second size and shape can be mounted in a wall merely by detaching at least parts of the holding plate and without the need for complex modification measures.

The loudspeakers are provided with a loudspeaker cover on the top side of the instrument panel. The loudspeaker cover preferably is supported on a supporting frame that is part of the instrument panel. The first variant of the loudspeaker is inserted from above into the cutout of the holding plate and can be fixed, for example, by spring clamps arranged on the edge of the cutout at positions that correspond to receptacles on the loudspeaker.

The second variant of the loudspeaker also is inserted from above into the cutout in the wall of the defroster duct, and may be connected to the wall by fastening screws. Nuts may be mounted in the wall at positions that correspond to positions of the fastening screws. The nuts may be clamping nuts that can be clamped onto the edge of the receptacle. In this way, the loudspeaker can be inserted, in a simple manner, from above and fixed by means of the screws in the nuts.

An exemplary embodiment of the invention is illustrated in the drawings and will be described in more detail below.

DETAILED DESCRIPTION OF THE PREFERRED EMBODIMENT

Figure 1:
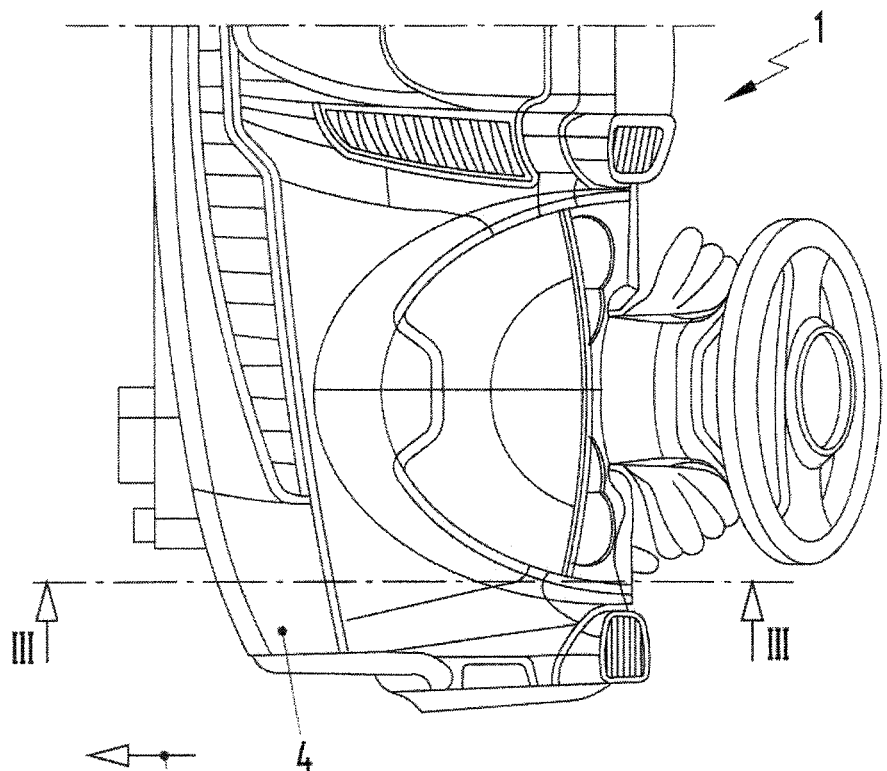
FIG. 1 is a top plan view of one half of an instrument panel of a motor vehicle, with a loudspeaker with cover being arranged at a longitudinal side.

A motor vehicle has an instrument panel 1 and a loudspeaker 2 or 3 is to be inserted into left and right corners of the instrument panel 1. The loudspeaker 2 or 3 is to be covered at the top side by a loudspeaker cover 4 or a faceplate.

Two variants of loudspeakers 2 or 3 may be installed, with one loudspeaker 2 having a circular shape and the other loudspeaker 3 having a rectangular shape. The loudspeaker variants 2 and 3 may be tweeters.

To insert the different variants of loudspeakers 2 or 3, a holding plate 10 is inserted in a wall 5, such as a wall of a defroster duct 9. The holding plate 10 has a circular cutout 7 for inserting the circular loudspeaker 2. The defroster duct 9 or the wall part 5 is held on a supporting part 21 of the instrument panel 1.

The holding plate 10 is connected to the wall 5 of the defroster duct 9 and predetermined breaking points 11 are defined on parts of the holding plate 10 between the circular cutout 7 of the holding plate 10 and the edge of the defroster duct 9. The predetermined breaking points 11 are defined by thinned regions, perforations, slots or other weakened areas.

The predetermined breaking points 11 enable at least part of the holding plate 10 to be detached from the wall 5 to form the larger receptacle 6 for the rectangular loudspeaker 3. The design of the holding plate 10 with the circular receptacle 7 and the predetermined breaking points 11 enables the simple formation of the second larger receptacle 6 for the rectangular loudspeaker 3.

The loudspeakers 2 or 3 are covered by the loudspeaker cover 4 on the top side of the instrument panel 1. The loudspeaker cover 4 is supported on a supporting frame 12 that is part of the top side of the instrument panel 1.

Figure 3:
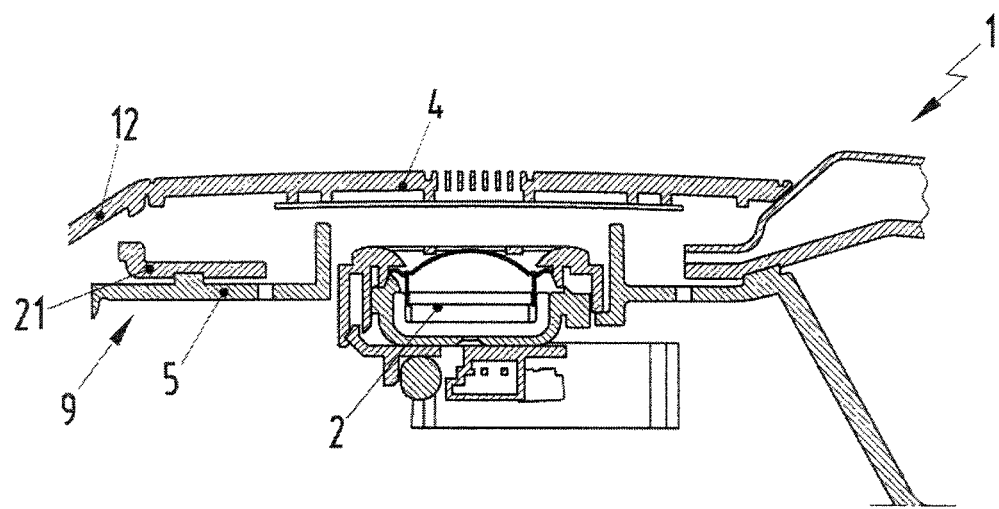
FIG. 3 is a cross-section through line in FIG. 1.
Figure 4:
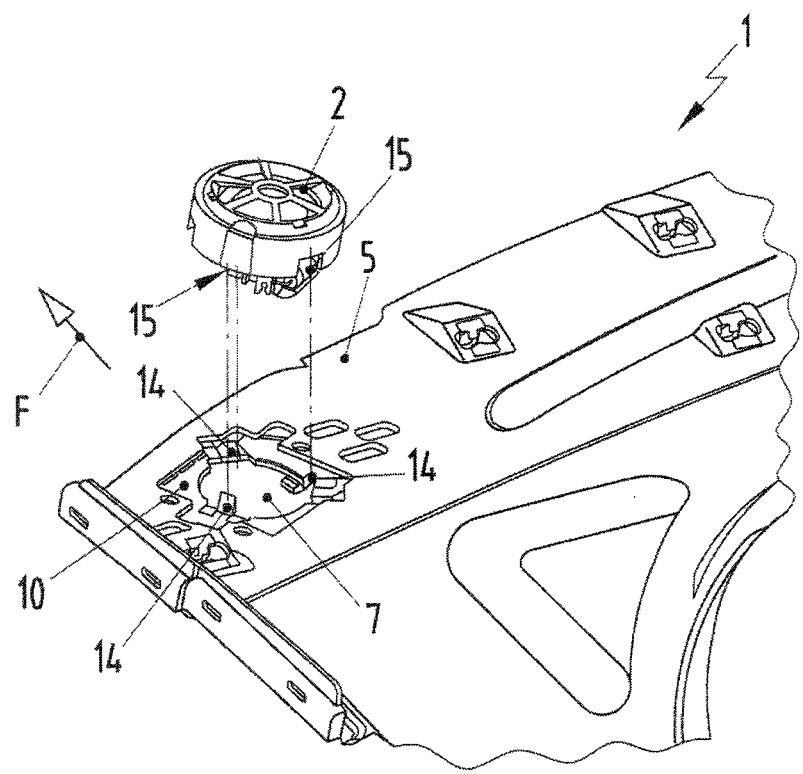
FIG. 4 is a perspective view of the instrument panel with the holding plate and a circular loudspeaker.

The circular variant of the loudspeaker 2 (FIGS. 3 and 4) is inserted into the circular cutout 7 of the holding plate 10 from above and fixed by spring clamps 14. The spring clamps are arranged on the edge of the cutout 7 and are provided correspondingly with respect to correspondingly formed cutouts or receptacles 15 on the edge of the loudspeaker 2.

Figure 2:
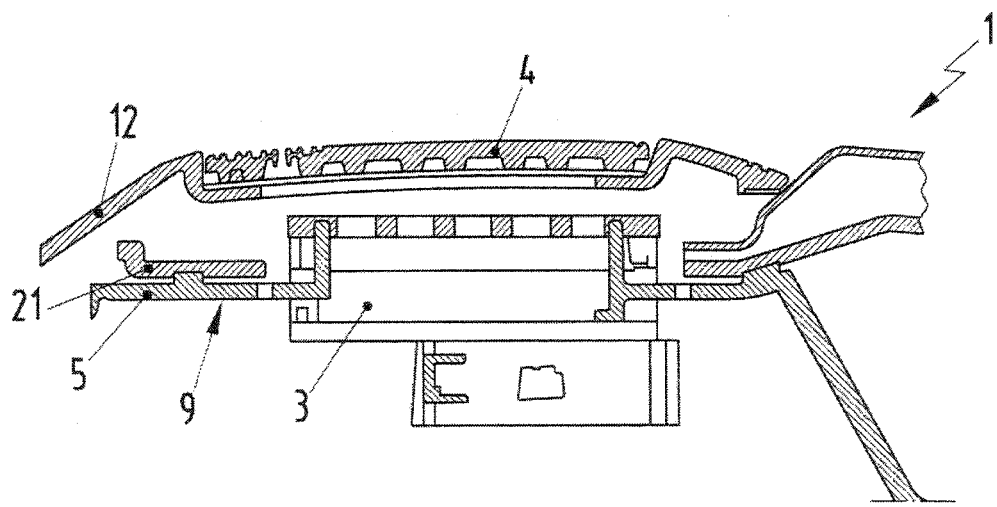
FIG. 2 is a longitudinal section through the receptacle for the loudspeaker of rectangular shape.
Figure 5:
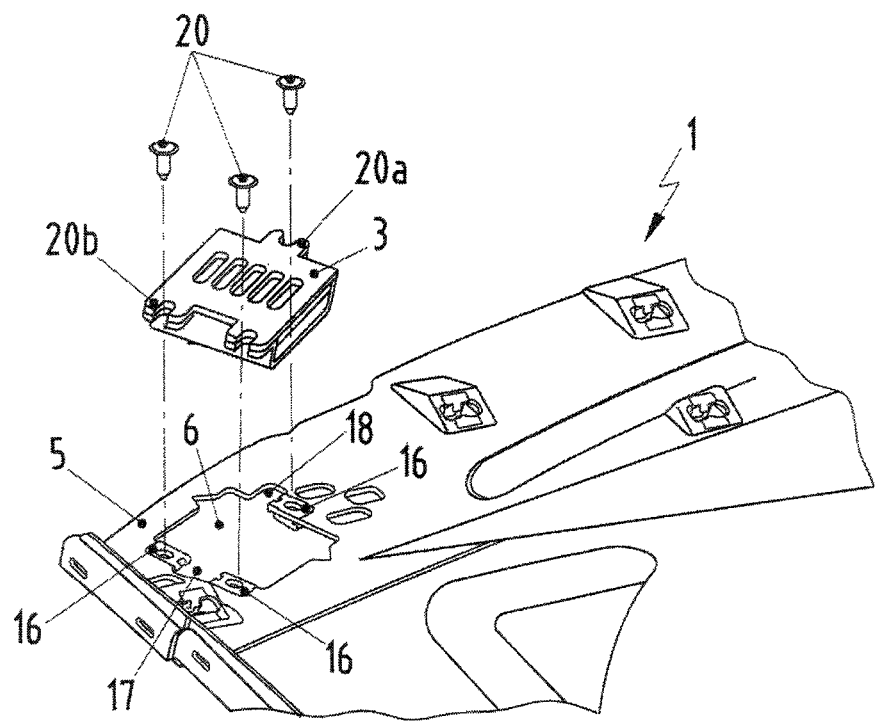
FIG. 5 is a perspective view of the instrument panel with the holding plate detached and a rectangular loudspeaker.
Figure 6:
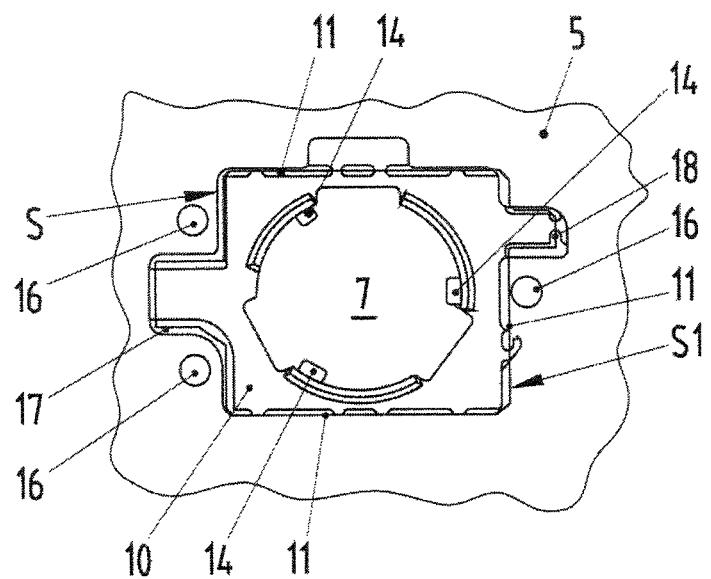
FIG. 6 is a top plan view of the holding plate.

The rectangular variant of the loudspeaker 3 (FIGS. 2 and 5) also is inserted from above into the correspondingly rectangular cutout 6 in the wall 5 of the defroster duct 9. Fastening screws 20 are arranged in projecting webs 20a, 20b of the loudspeaker 3 and cooperate with clamping nuts 16 to connect the loudspeaker 3 to the wall 5 of the defroster duct 9. The fastening screws 20 and the clamping nuts 16 are distributed about the periphery of the cutout 6.

The clamping nuts 16 are arranged on the end side of the rectangular cutout 7 in the wall 5. Two clamping nuts 16 are arranged on one end side S and are disposed on either side of a slot-shaped opening 17. The further clamping nut 16 is arranged on the opposite side S1 of the cutout 7 and is arranged directly adjacent to a further slot-shaped opening 18 of the cutout 7. The slot-shaped openings 17 and 18 may be supply ducts or other functional ducts.

What is claimed is:

1. A holding device for holding loudspeakers on an instrument panel of a motor vehicle, comprising: a supporting part for the instrument panel, the supporting part having an outer surface facing into a passenger compartment, an inner surface opposite the outer surface and a first cutout defined by an edge extending between the inner and outer surfaces, a holding plate mounted to the inner surface of the supporting part and partly closing the first cutout, the holding plate being formed with a second cutout smaller than the first cutout and disposed inward of the edge, the second cutout being configured for inserting a first variant of a loudspeaker, the holding plate further having predetermined breaking points arranged substantially end-to-end at positions substantially aligned with the edge of the first cutout in the supporting part, the predetermined breaking points enabling at least parts of the holding plate outward of the second cutout to be detached to obtain a third cutout larger than the second cutout and at least partly aligned with the first cutout for inserting a second variant of a larger loudspeaker.

2. The holding device of claim 1, characterized in that the second cutout for the first variant of the loudspeaker is substantially circular.

3. The holding device of claim 1, wherein the third and larger cutout for the second variant of the loudspeaker is substantially rectangular after detaching at least parts of the holding plate along the predetermined breaking points.

4. The holding device of claim 1, further comprising a loudspeaker cover on a top side of the instrument panel and covering the loudspeaker, the loudspeaker cover being supported on a supporting frame that is part of the instrument panel.

5. The holding device of claim 1, wherein the first variant of the loudspeaker is configured to be inserted from above into the second cutout, spring clamps arranged on edges of the second cutout and receptacles at positions on the loudspeaker corresponding to the spring clamps, the spring clamps engaging the receptacles to hold the first variant of the loudspeaker on the holding plate.

6. The holding device of claim 1, wherein the second variant of the loudspeaker is configured to be inserted from above into the first cutout in the supporting part of the instrument panel and into the third cutout of the holding plate, nuts mounted to the wall and fastening screws engaging the second variant of the loudspeaker and secured to the nuts for mounting the second variant of the loudspeaker to the wall.

7. The holding device of claim 6, wherein the nuts are clamping nuts clamped onto the wall at the edge of the first cutout.

8. The holding device of claim 1, the holding plate is part of a defroster duct held on an underside of the supporting part of the instrument panel.

9. A motor vehicle comprising: an instrument panel, a duct beneath the instrument panel, the duct having a wall including a first cutout defined by an edge, a holding plate mounted to the wall and partly closing the first cutout, the holding plate being formed with a second cutout smaller than the first cutout and disposed inward of the edge, the second cutout being configured for inserting a first variant of a loudspeaker, the holding plate having predetermined breaking points arranged substantially end-to-end outward of the second cutout and enabling at least parts of the holding plate between the second cutout and the first cutout to be detached from the holding plate to obtain a third cutout larger than the second cutout and configured for inserting a second variant of a loudspeaker.

10. The motor vehicle of claim 9, wherein the second cutout for the first variant of the loudspeaker is substantially circular.

11. The motor vehicle of claim 10, wherein the third and larger cutout for the second variant of the loudspeaker is substantially rectangular after detaching at least parts of the holding plate along the predetermined breaking points.

* * * * *